T. R. KRZYZANOWSKI.
ARMORED AUTOMOBILE.
APPLICATION FILED JULY 25, 1917. RENEWED APR. 13, 1918.

1,295,177.

Patented Feb. 25, 1919.
2 SHEETS—SHEET 1.

Inventor
T. R. Krzyzanowski

By A. M. Wieson
Attorney

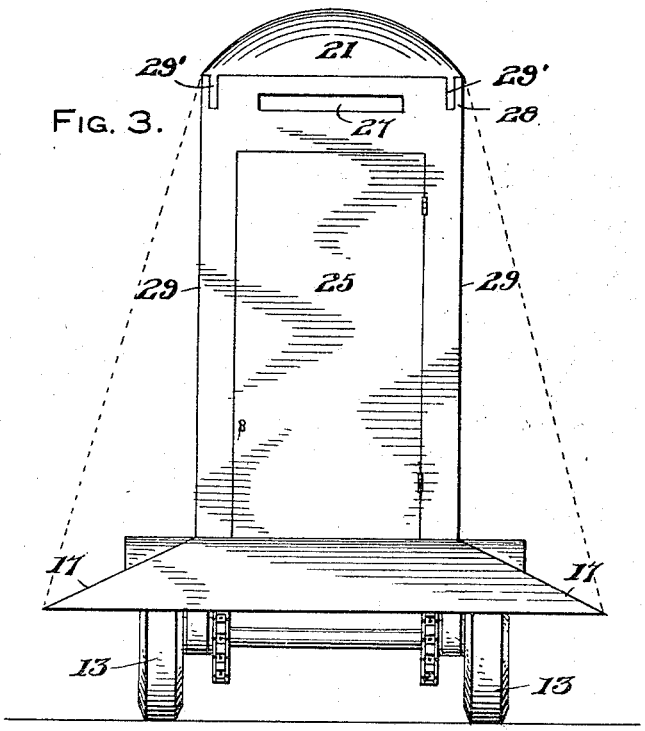
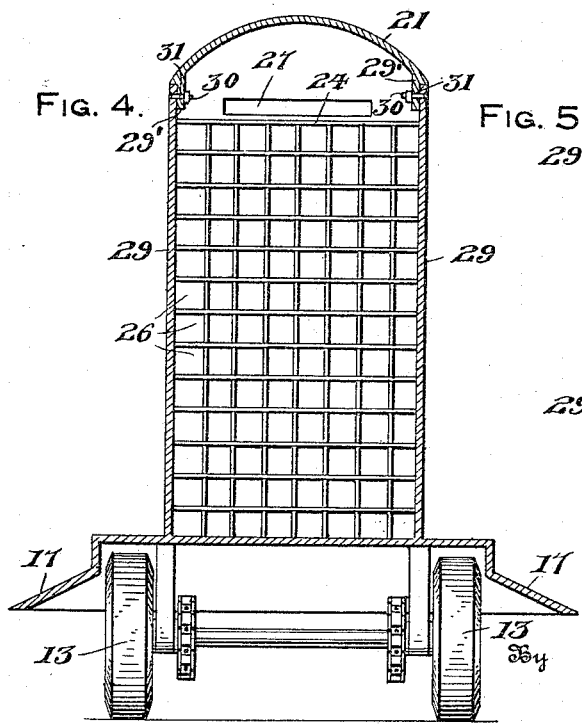
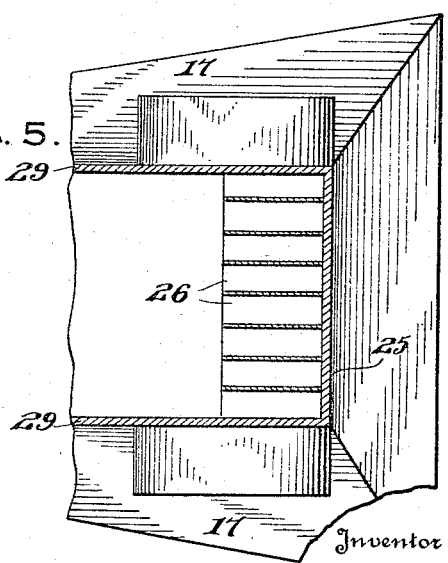

UNITED STATES PATENT OFFICE.

THEODORE R. KRZYZANOWSKI, OF PHILADELPHIA, PENNSYLVANIA, ASSIGNOR OF ONE-HALF TO S. S. PINDER, OF WALL, PENNSYLVANIA, AND TEN ONE-HUNDREDTHS TO FRANK GLIWSKI, OF CHICOPEE, MASSACHUSETTS.

ARMORED AUTOMOBILE.

1,295,177. Specification of Letters Patent. Patented Feb. 25, 1919.

Application filed July 25, 1917, Serial No. 182,675. Renewed April 13, 1918. Serial No. 228,500.

*To all whom it may concern:*

Be it known that I, THEODORE R. KRZYZANOWSKI, a subject of the Emperor of Austria, residing at Philadelphia, in the county of Philadelphia and State of Pennsylvania, have invented certain new and useful Improvements in Armored Automobiles, of which the following is a specification.

This invention relates to certain new and useful improvements in armored automobiles.

The primary object of the invention is the provision of an automobile especially adapted for use in time of war, the same being provided with a protected gun carriage whereby a gun may be sighted either upwardly or at an inclination, provision being made for conveniently storing a supply of ammunition.

A further object of the device is the provision of a war automobile serving as a gun carriage mount, a protecting body or turret being provided for housing the gun and a supply of ammunition carried by the automobile, as well as protecting the gunners and the driver of the automobile.

A still further object of the device is the provision of an armored war car provided with its own motive power and being constructed of light weight and easy to manufacture, while at the same time affording suitable protection against bullets and other flying missiles and being capable of accommodating a suitable form of shiftable gun as well as the soldiers in charge of the same.

In the drawing forming a part of this application and in which like designating characters refer to corresponding parts throughout the several views, Figure 1 is a central, vertical, longitudinal, sectional view of the device.

Fig. 3 is a rear elevation of the same.

Fig. 4 is a vertical transverse sectional view taken upon line IV—IV of Fig. 1 and, Fig. 5 is a horizontal sectional view taken upon line V—V of Fig. 1.

Figure 1:
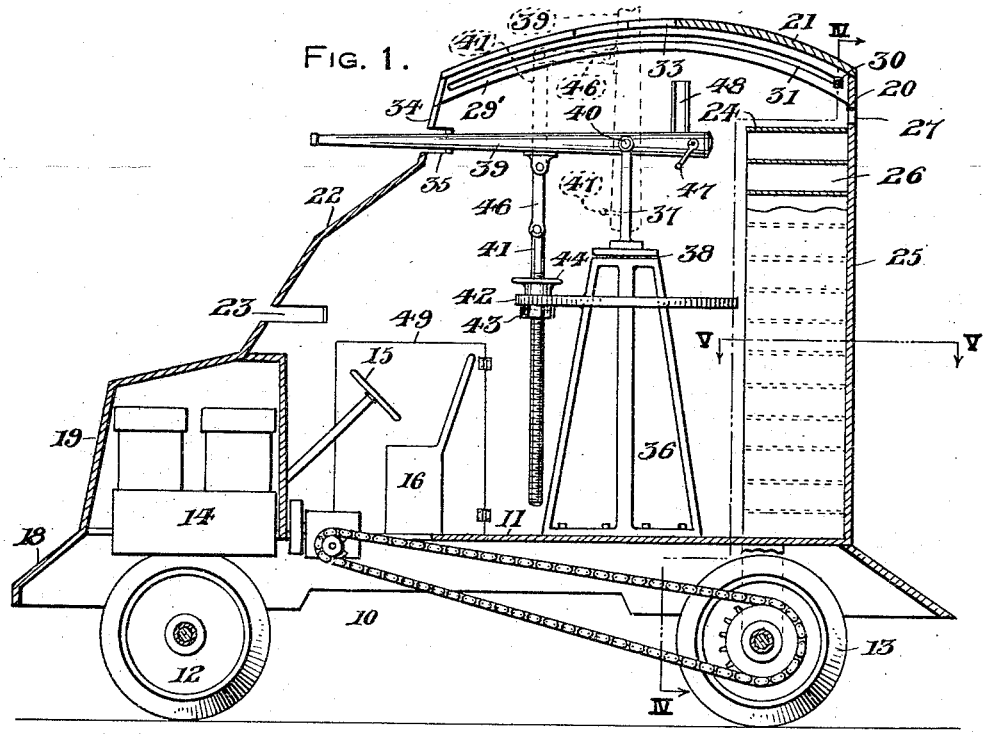
Figure 2:
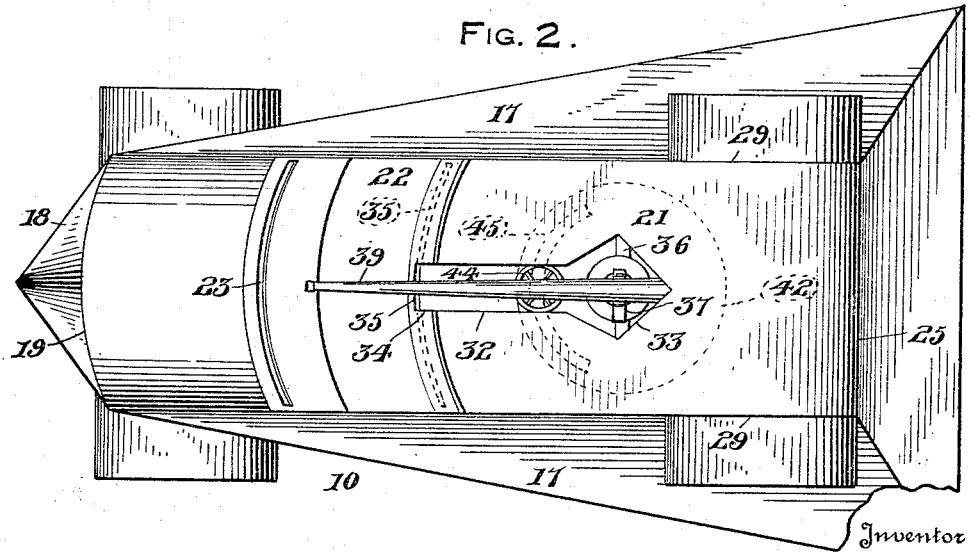
Fig. 2 is a top plan view thereof.

The preferred embodiment of the invention as herein set forth broadly comprises an automobile 10 having a mounting platform 11, forward guide wheels 12, rear traction wheels 13, a motor 14, a steering wheel 15 and a driver's seat 16 substantially of the usual form. Downwardly sloping outwardly projecting eaves 17 are provided for the platform 11 and afford protection for the running gear against missiles. The eaves 17 merge in a sloping pointed portion 18 at the front of the device forwardly of the protecting hood 19 provided for the motor 14.

A car body or cab 20 is mounted upon the platform 11 formed of bullet proof material, such as steel, the same having a curved roof 21 and a downwardly sloping forward side 22 merging with the top of the hood 19. An elongated horizontal opening 23 is provided in the forward side 22 transversely of the car to permit an operator using the seat 16 to have a clear vision outwardly of the car. A cartridge case 24 is arranged within the cab adjacent the rear upright wall 25 thereof and is provided with compartments 26 for receiving the cartridges, while sufficient space remains between the top of the case 24, and the roof 21, to arrange a transverse opening 27 in the rear wall 25, whereby the occupants of the cab may obtain a view rearwardly thereof.

The roof 21 of the cab is slidably mounted longitudinally thereof and is provided with depending flanges 29' fitting within the slots 28 in the forward and rear sides 22 and 25 respectively of the cab and maintained in slidable relations with the opposite side walls 29 thereof by means of bolts 30 carried by the said walls and freely arranged through slots 31 in the said flanges 29'. In this manner the roof 21 may be slidably moved rearwardly leaving substantially the entire inclosure open at the top thereof. It will be noted however that a longitudinal opening 32 is provided in the top 21 terminating in an enlargement 33 substantially centrally of the top and adapted for accommodating the movements of a gun therethrough in sighting at different inclinations. The opening 32 communicates with an upright slot 34 in the forward side 22 of the cab which in turn communicates with a transverse opening 35 in the forward side and is adapted for the reception of a gun for accommodating the same for swinging laterally during the sighting and firing operation. A desirable form of gun carriage 36 is mounted upon the platform 11 within the cab and is provided with a vertical bracket 37 mounted upon a turn table 38 for revolving thereon while a gun 39 is trunnioned as at 40 to the upper end of the bracket 37 and is adapted to be moved to the desired inclination when firing at elevated objects such as air craft. An inclination adjusting and steadying means is provided for the gun 39 in the form of a jack screw 41 slidably arranged within a circular plate 42 surrounding the carriage 37 and adapted to be maintained in any desired position by means of a lock nut 43 carried by the screw. The plate 42 is provided with an arcuate slot 45 through which the jackscrew 41 freely projects whereby rotary movements of the gun 30 upon the turn table 38 will carry therewith the said screw 41. A thumb-nut 44 is threaded on the screw 41 above the circular plate 42, and coöperates with the nut 43 in securing the screw in adjusted positions.

A link 46 pivotally connects the upper end of the screw 41 with the gun 39 at a point spaced forwardly of the gun pivot 40, whereby the vertical movement of the screw adjusts the inclination of the gun 39, and the gun is so retained in position for sighting and firing by adjusting the nuts 43 and 44 on opposite sides of the circular plate 42.

The gun 39 may be of any desired form and is preferably provided with a firing member such as 47 and a sighting member such as 48. It will be understood that the gunners within the cab may readily move the gun 39 transversely of the car through the horizontal slot 35 while the gun may be readily shifted upwardly through the opening 34 when desired and positioned vertically by moving it through the slot 32 and into the enlargement 33 as best illustrated by dotted lines in Fig. 1 of the drawings. When desired, the roof 21 may be entirely pushed rearwardly permitting a free movement of the gun 39 at suitable inclinations in any desired direction. As illustrated in Fig. 1, entrance of the cab is gained through the side door 49.

The gunners and driver as well as the gun and the ammunition within the case 24 will be protected against missiles. A serviceable armored car is provided which is readily moved about and may be utilized in shooting in all directions including its use in fighting aeroplanes and balloons. It will be understood that minor changes may be made from the construction herein illustrated without departing from the spirit of the invention as claimed.

What I claim as new is:

1. An armored automobile comprising a platform, a cab mounted thereon having upper and lower transverse slots in its forward side adapted as sight openings, a longitudinally slidable arcuate roof upon the car having a longitudinal slot forwardly terminating in communication with one of said transverse slots and further having an enlargement substantially centrally of the top and a gun swivelly mounted within the cab adapted for swinging movement through the said slots and opening.

2. An armored car comprising a platform, depending eaves outwardly projecting from said platform, a cab mounted upon the platform and having a horizontal slot in its front wall, and a slidable top on the cab adapted for rearward movement to uncover the forward part of the cab top, the said front wall and top having communicating openings in communication with the said horizontal slot when the top is in its forward closed position.

3. A device of the class described comprising a standard, a bracket journaled upon the top thereof, a gun horizontally pivoted upon said bracket, a circular plate provided with an arcuate slot carried by said standard, a vertical adjusting screw loosely extending through the plate slot, a thumb-nut upon said screw above the circular plate, a lock nut on said screw beneath said plate, and a link pivotally connected between the upper end of said screw and gun whereby the gun is adapted for pivotal movement to vary the inclination thereof simultaneously with the operation of said screw.

4. An armored automobile including a platform, a cover section therefor, the said cover being provided with longitudinal and transverse communicating slots, a standard upon said platform, a vertical bracket journaled upon said standard, a gun pivotally mounted upon said bracket, a plate carried by said standard, and an adjusting screw extending between said plate and gun for controlling the inclination and lateral swing of the gun through the cross shaped slots.

5. An armored automobile including a platform, a cover section therefor, the said cover being provided with longitudinal and transverse communicating slots, a standard upon said platform, a vertical bracket journaled upon said standard, a plate provided with an arcuate slot fixed to said standard, a gun having the muzzle end projecting through said cross shaped slots pivoted upon the upper end of said bracket, a jack screw loosely extending through the arcuate slot in said plate, adjusting nuts upon said screw positioned at opposite sides of said plate, a link connection between the upper end of said jack screw and gun whereby the inclination and lateral swing of the gun is controlled.

In testimony whereof I affix my signature.

THEODORE R. KRZYZANOWSKI.

Copies of this patent may be obtained for five cents each, by addressing the "Commissioner of Patents, Washington, D. C."